United States Patent
Waldron

(10) Patent No.: US 6,327,485 B1
(45) Date of Patent: Dec. 4, 2001

(54) FOLDING MOBILE PHONE WITH INCORPORATED ANTENNA

(75) Inventor: Rupert James Waldron, Berkshire (GB)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/465,517

(22) Filed: Dec. 16, 1999

(30) Foreign Application Priority Data

Dec. 19, 1998 (GB) .................................................. 9827926

(51) Int. Cl.⁷ ...................................................... H04Q 7/32

(52) U.S. Cl. ........................... 455/575; 455/90; 455/128; 455/129; 455/347; 455/121; 379/428.01; 379/433.01; 343/702

(58) Field of Search ............................... 455/575, 90, 550, 455/562, 128, 129, 347, 121, 348; 379/428.01, 433.01, 433.05, 433.11; 343/702, 881, 882

(56) References Cited

U.S. PATENT DOCUMENTS

| | | | |
|---|---|---|---|
| 4,992,799 | * | 2/1991 | Garay .................................... 343/702 |
| 5,337,061 | * | 8/1994 | Pye et al. .............................. 343/702 |
| 5,542,106 | * | 7/1996 | Krenz et al. ............................. 455/90 |
| 5,561,437 | * | 10/1996 | Phillips et al. ........................ 343/702 |
| 5,608,413 | * | 3/1997 | Macdonald ............................ 343/702 |
| 5,752,204 | * | 5/1998 | Epperson et al. ..................... 455/575 |

* cited by examiner

*Primary Examiner*—William Trost
*Assistant Examiner*—Keith Ferguson
(74) *Attorney, Agent, or Firm*—Sughrue, Mion, Zinn, Macpeak & Seas, PLLC

(57) ABSTRACT

A folding mobile phone with incorporated antenna is disclosed. A folding mobile phone comprises a first and second housings connected by a hinge mechanism each other. A first conductive film is incorporated with the first housing, and a second conductive film is incorporated with the second housing. When the mobile phone is in an open position a monopole antenna is constituted by the first and second conductive films, when the mobile phone is in a closed position the second conductive film acts as a ground plane.

24 Claims, 4 Drawing Sheets

FOLDING MOBILE PHONE WITH INCORPORATED ANTENNA

BACKGROUND OF THE INVENTION

1. Field of the Invention

The present invention relates to mobile phones, and more particularly to folding mobile phones having an incorporated antenna.

2. Description of the Related Art

The design of antennas for mobile phones capable of operation in more than one frequency band (dual mode or tri-mode) is constrained by the market demand continually to reduce die overall size of mobile phones. Preference by many customers for external metallic finishes on the mobile phone housings can also increase the difficulty of antenna design.

The volume occupied by the antenna and associated circuitry and their costs are important factors for a satisfactory design as well as antenna effectiveness over a sufficiently wide operating bandwidth. Preferably the antenna will be incorporated into the mobile phone so that it is not noticeable by the user.

SUMMARY OF THE INVENTION

It is an object of the present invention to provide a folding mobile phone capable of realizing both miniaturization and antenna effectiveness over a sufficiently wide operating bandwidth.

According to the present invention there is provided a folding mobile phone including a first and second housings connected by a hinge mechanism each other, and the folding mobile phone comprising, a first conductive film incorporated with the first housing, and a second conductive film incorporated with the second housing, when the first and second housings are in a open position constituting a monopole antenna together with the first conductive film, and when the first and second housings are in a closed position acting as a ground plane.

In the present invention, a first conductive film is incorporated with the first housing, and a second conductive film is incorporated with the second housing, and when the mobile phone is in an open position a monopole antenna is constituted by the first and second conductive films, when the mobile phone is in a closed position the second conductive film acts as a ground plane. Therefore, miniaturization and antenna effectiveness over a sufficiently wide operating bandwidth are both realized.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
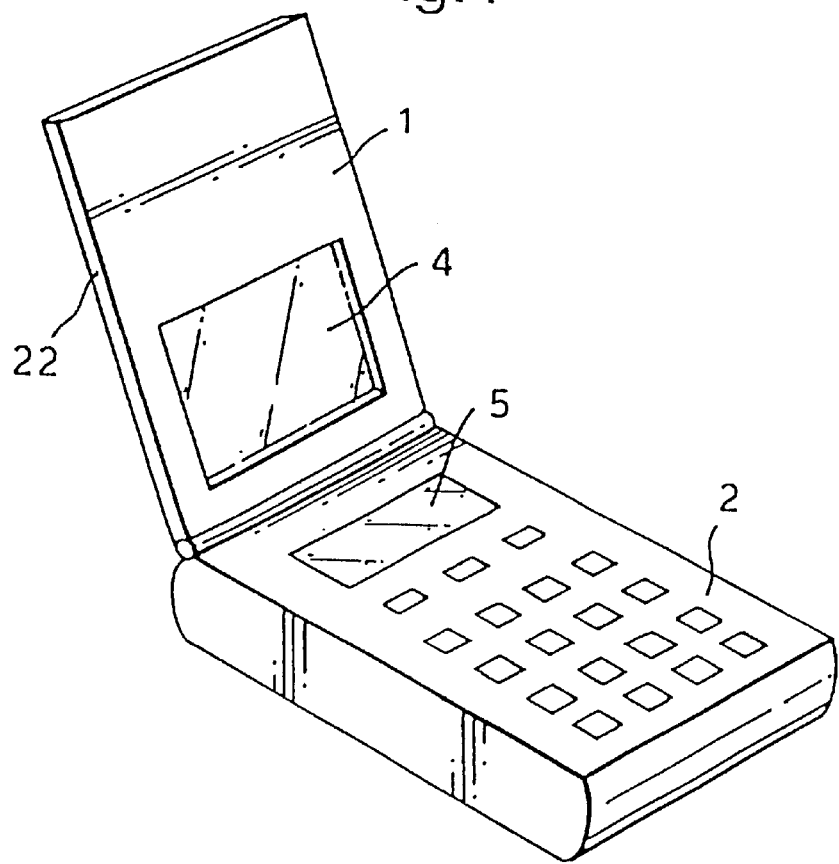
FIG. 1 shows a folding phone in the open position.

With reference to FIG. 1, a folding mobile phone of an embodiment according to the present invention comprising two main housings 1,2 connected by a hinge mechanism. A first housing 1 is the top section of the mobile phone and a second housing 2 is the bottom section of the mobile phone. The display screen and keypad would usually be located in the bottom section of the mobile phone. Conveniently the top section of the mobile phone will include a window 4 for providing viewing access to a display screen or direct access to part of a keypad when the mobile phone is in the closed position. When the mobile phone is closed a window 4 in the housing (top section) 1 gives visual access to the visual display 5 located in the housing (bottom section) 2.

Figure 2:
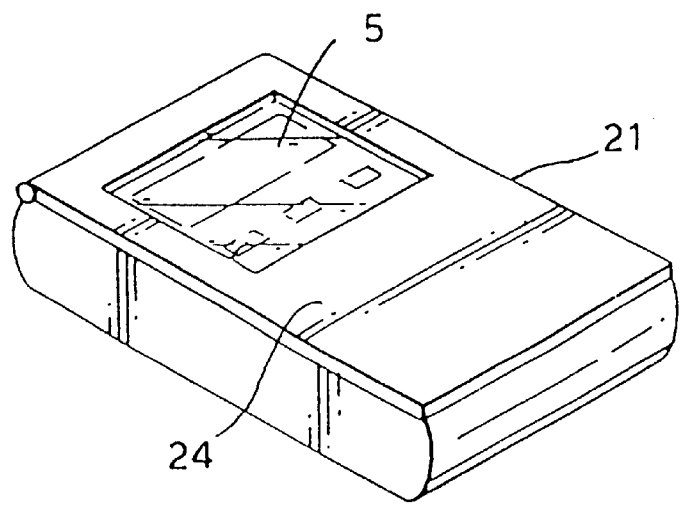
FIG. 2 shows a folding phone in the closed position.

The mobile phone is normally used in the open position (normal position) as shown in FIG. 1, but incoming calls as well as text and data messages must be received when the mobile phone is in the closed position (standby position) as shown in FIG. 2. Performance of the antenna when the mobile phone is in the closed position must be sufficient to allow the satisfactory reception of the incoming calls.

The mobile phone operates in dual mode. That is to say it may be used to communicate with networks operating in either of Ale two frequency bands GSM 900 and PCN 1800. The GSM system (Global System for Mobile communications formerly Group Special Mobile) operates in the band 890 to 900 megahertz and the PCN system (Personal Communications Network) operates in the band 1710 to 1880 MHz. The mobile phone incorporating an antenna according to the present invention is not restricted to dual band use and may be operated in a third band (Tri-band operation) e.g. DCS 1900 (Digital Cellular Service) operating around 1900 MHz.

The top section 1 houses a receiver and connecting leads and the other components necessary for a mobile phone are housed in bottom section 2. Operation of the mobile phone and incorporation of the antenna does not depend on the inclusion of window 4.

Various surfaces may have a conductive metallic finish applied to them. In this example the top surface 21 has applied to it a metallic finish so as to provide a conductive film 24 as well as to provide a desired cosmetic appearance. The conductive film 24 is applied to the whole of the top surface 21 except for the window 4 and forms part of the antenna of the mobile phone. If window 4 was not required then conductive film 24 would conveniently be applied to the whole of the top surface 21. The conductive film 24 has an overall length of $97 \times 10^{-3}$ meters, an overall width of $55 \times 10^{-3}$ meters and a thickness of $15 \times 10^{-6}$ meters. The dimensions of the window 4 are width $32 \times 10^{-3}$ meters and length $26 \times 10^{-3}$ meters. The conductive film 24 surrounds the window 4.

For satisfactory results the area, in plan, of the conductive film 24 incorporated with the first housing should be greater than two thirds of the area, in plan, of the first housing. The area, in plan, of the first housing should be taken to include the area of window 4.

Figure 3:
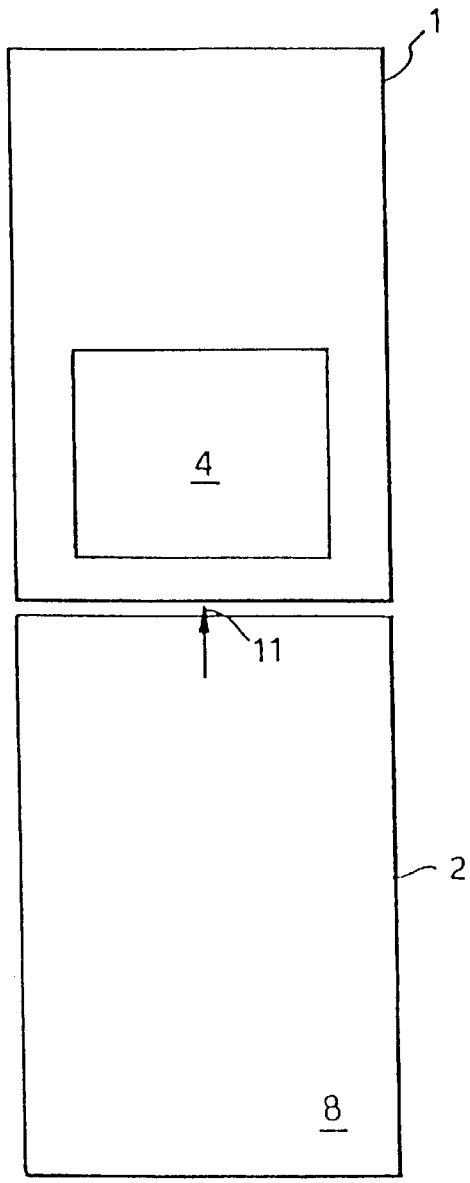
FIG. 3 is a plan view of the phone in the open position.

Within bottom section 2, a copper sheet (conductive film) 8 having an area slightly less than the area in plan of bottom section 2 is disposed. The dimensions of copper sheet 8 are $97 \times 10^{-3}$ meters length, $55 \times 10^{-3}$ meters width and thickness of $15 \times 10^{-6}$ meters. Copper sheet 8 is formed as a conductive film upon a PCB (Printed Circuit Board) by standard manufacturing techniques and the position of copper sheet 8 is indicated in FIG. 3. The plan view of FIG. 3 illustrates the extent and position of the two conductive films and the location of the antenna feeding point 11.

When the mobile phone is in the open position, the conductive film 24 and copper sheet 8 in combination operate as a monopole antenna. Excitation of the antenna in the normal operating position is via a coaxial lead at antenna feeding point 11 across the edges of the two conductive films 8, 24. The antenna in the open position is not resonant within the frequency bands of operation and has a wide band response. Resonance is constrained by the width (area) of the high conductivity film 24.

Figure 5:
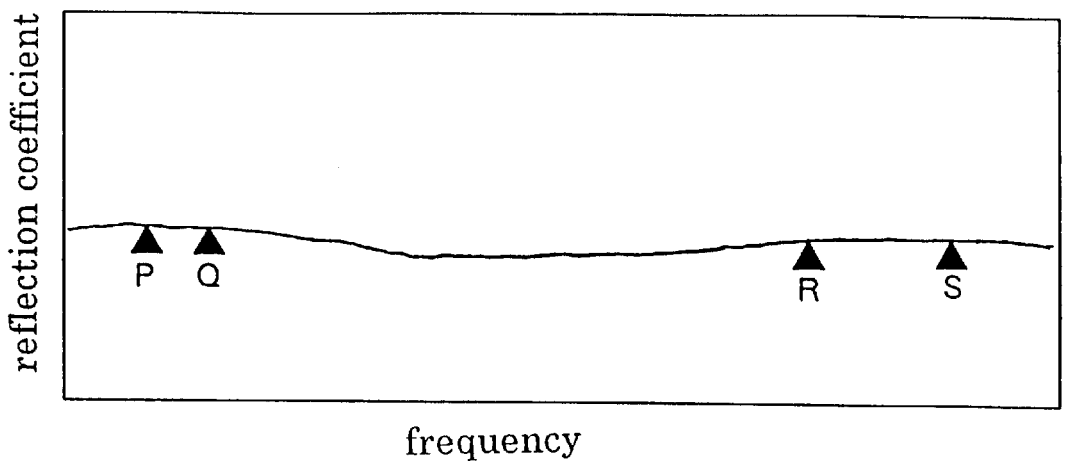
FIG. 5 is a plot of antenna reflection coefficient in the open position.

The wide band performance of the antenna in the open position of the mobile phone is exhibited in FIG. 5 which is a plot of reflection coefficient versus frequency for the antenna. The measured attenuations with reference to 0 dB at the points marked on the plot of FIG. 5 are:

P, −11 dB at the frequency 890 MHz

Q, −10 dB at 960 MHz

R, −9 dB at 1.71 GHz

S, −7 dB at 1.88 GHz

Figure 4:
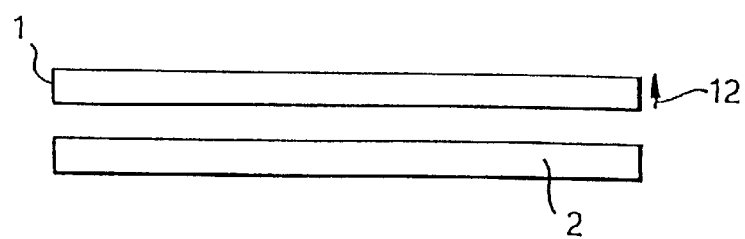
FIG. 4 is a side view illustrating the antenna in the closed position.
Figure 7:
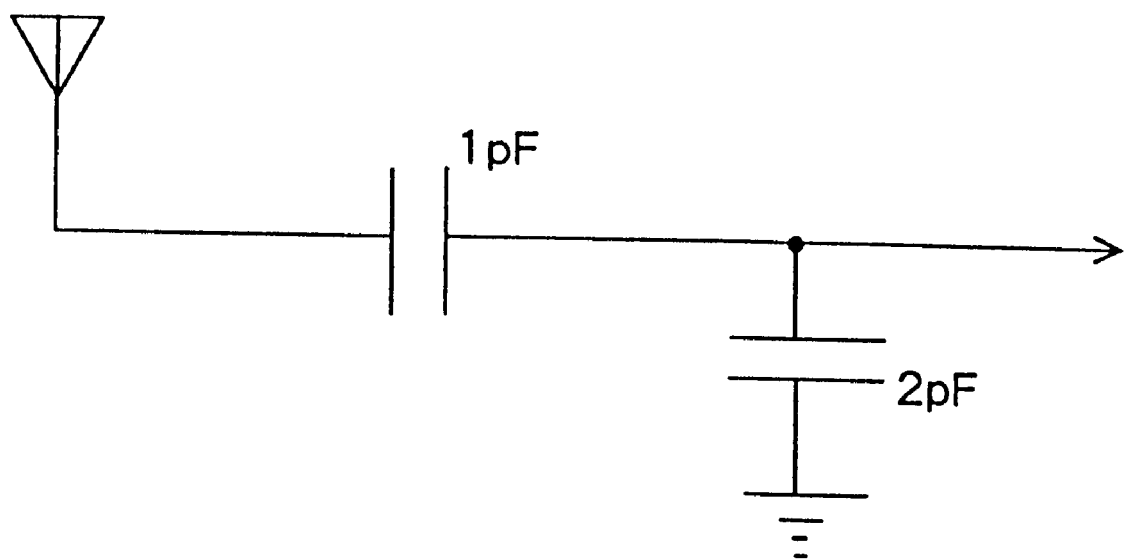
FIG. 7 is a matching circuit used in the closed position.

When the mobile phone is closed into the closed position, the conductive film 24 overlays in parallel spaced relationship the copper sheet 8 as illustrated in FIG. 4. In the closed position, only the conductive film 24 is fed at antenna feeding point 12 via a matching circuit as shown in FIG. 7 and the copper sheet 8 acts as a ground plane. The antenna in the closed position operates in the manner of a patch antenna.

The switching required when the mobile phone is moved between the closed and open positions may be effected mechanically by means of a cam in the hinge mechanism. Alternatively an electronic switch may be used which would require a logic line to provide an indication of the open or closed state of the mobile phone. These switching means are well known in the prior art.

Figure 6:
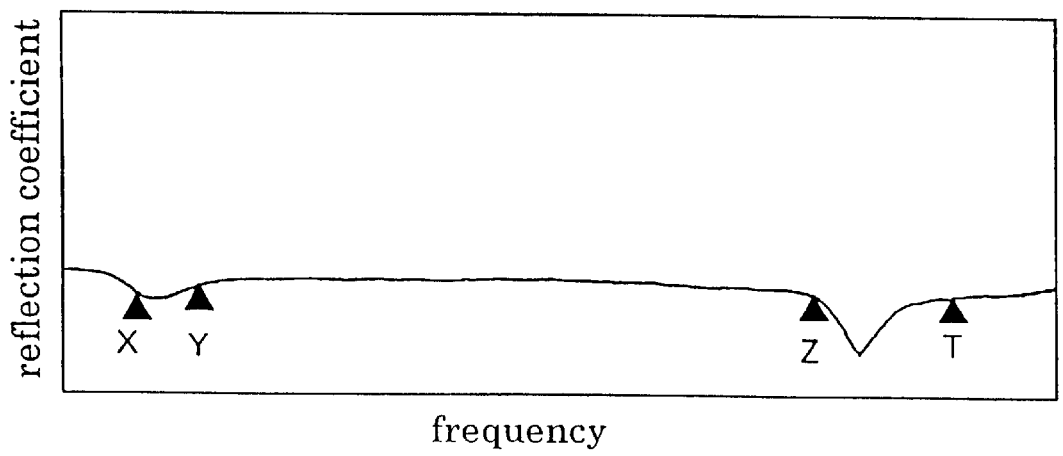
FIG. 6 is a plot of antenna reflection coefficient in the closed position.

The performance of the antenna in the closed position is shown in FIG. 6 which is a plot of reflection coefficient versus frequency. The measured attenuation with reference to 0 dB at the points marked on the plot of FIG. 6 are:

X−5 dB at the frequency of 890 MHz

Y−2 dB at 960 MHz

Z−4 dB at 1.710 GHz

T−4 dB at 1.880 GHz

In this embodiment the conductive film 24 is shown as applied to the planar top surface 21 and therefore is itself planar. It has been found empirically that the conductive film 24 may be applied to surfaces which depart considerably from the planar without significant loss of performance for the antenna.

With reference to FIGS. 1 and 2, the conductive film 24 covering the top surface 21 may be extended to cover the edges 22 of the housing 1 without significant loss of antenna effectiveness. The antenna as described can therefore be used with a range of housing profiles.

A conductive film may be applied to the inside surface of the housing instead of to the outside surface. By this means an inside profile of a housing may be directed toward antenna performance whereas an outside profile of a housing may be dictated by some other feature such as appearance.

Application of the conductive film to the housing may be by electroplating, electroless-Plating or other standard techniques. The conductive films must have a high conductivity, however and this must be taken into account when specifying the techniques for application and the materials to be used for the conductive films. The conductive film incorporated with housing 1 may be formed on a PCB in the same manner as described above for copper sheet 8.

While a preferred embodiment of the present invention has been described using specific terms, such description is for illustrative purposes only, and it is to be understood that changes and variations may be made without departing from the spirit or scope of the following claims.

What is claimed is:

1. A folding mobile phone including a first and second housings connected by a hinge mechanism each other, said folding mobile phone comprising:

a first conductive film incorporated with said first housing; and a second conductive film incorporated with said second housing, when said first and second housings are in a open position constituting a monopole antenna together with said first conductive film, and when said first and second housings are in a closed position acting as a ground plane.

2. A folding mobile phone according to claim 1, wherein said first conductive film is a metallic finish on the outside of said first housing.

3. A folding mobile phone according to claim 1, wherein said first conductive film is a metallic finish on the inside of said first housing.

4. A folding mobile phone according to claim 1, wherein said first conductive film is formed on a PCB.

5. A folding mobile phone according to claim 1, wherein said second conductive film is a copper sheet formed on a PCB.

6. A folding mobile phone according to claim 1, wherein said second conductive film is a metallic finish applied to the outside of said second housing.

7. A folding mobile phone according to claim 1, wherein said second conductive film is applied to the inside of said second housing.

8. A folding mobile phone according to claim 1, wherein said folding mobile phone is a dual mode phone for operation in two network frequency bands.

9. A folding mobile phone according to claim 1, wherein said folding mobile phone is a tri-mode phone for operation in three network frequency bands.

10. A folding mobile phone according to claim 8, wherein the two network frequency bands are GSM 900 and PCN 1800.

11. A folding mobile phone according to claim 9, wherein the three network frequency bands are DCS 1900, GSM 900 and PCN 1800.

12. A folding mobile phone according to claim 1, wherein said first conductive film surrounds a viewing window disposed on said first housing.

13. A folding mobile phone according to claim 1, wherein the area, in plan, of said first conductive film is greater than two thirds of the area in plan of said first housing.

14. A folding mobile phone according to claim 13, wherein said first conductive film is a metallic finish on the outside of said first housing.

15. A folding mobile phone according to claim 13, wherein said first conductive film is a metallic finish on the inside of said first housing.

16. A folding mobile phone according to claim 13, wherein said first conductive film is formed on a PCB.

17. A folding mobile phone according to claim 13, wherein said second conductive film is a copper sheet formed on a PCB.

18. A folding mobile phone according to claim 13, wherein said second conductive film is a metallic finish applied to the outside of said second housing.

19. A folding mobile phone according to claim 13, wherein said second conductive film is applied to the inside of said second housing.

20. A folding mobile phone according to claim 13, wherein said folding mobile phone is a dual mode phone for operation in two network frequency bands.

21. A folding mobile phone according to claim 13, wherein said folding mobile phone is a tri-mode phone for operation in three network frequency bands.

22. A folding mobile phone according to claim 20, wherein the two network frequency bands are GSM 900 and PCN 1800.

23. A folding mobile phone according to claim 21, wherein the three network frequency bands are DCS 1900, GSM 900 and PCN 1800.

24. A folding mobile phone according to claim 13, wherein said first conductive film surrounds a viewing window disposed on said first housing.

* * * * *